B. SKOUGE.
COOKING VESSEL.
APPLICATION FILED APR. 22, 1911.
1,001,778. Patented Aug. 29, 1911.
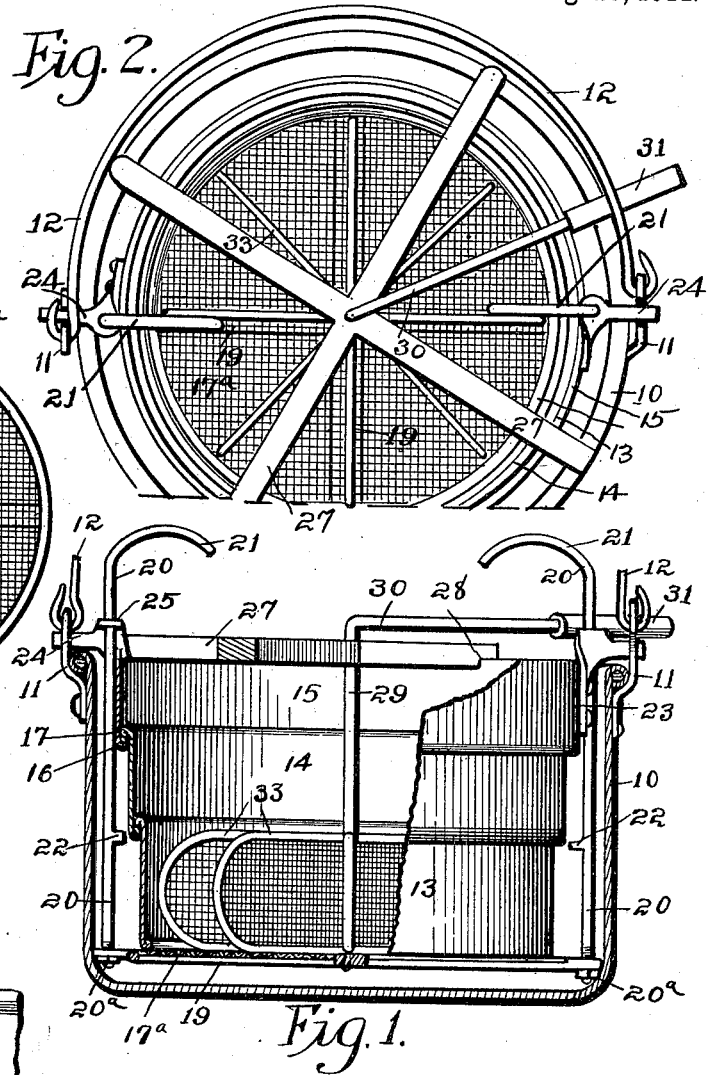
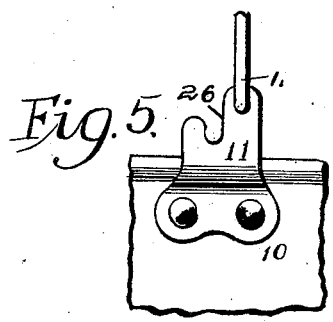
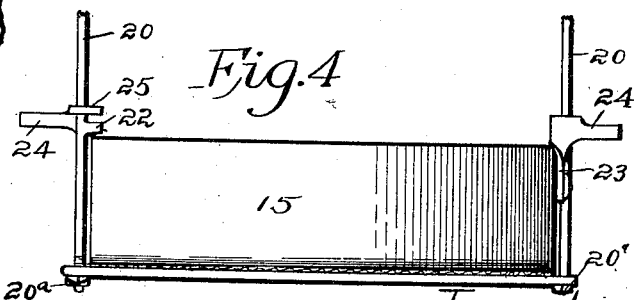
Witnesses
A. G. Hague
W. A. Loftus
Inventor
Belle Skouge
By J. Ralph Dwight

UNITED STATES PATENT OFFICE.

BELLE SKOUGE, OF FOREST CITY, IOWA.

COOKING VESSEL.

1,001,778.  Specification of Letters Patent.  Patented Aug. 29, 1911.

Application filed April 22, 1911. Serial No. 622,636.

*To all whom it may concern:*

Be it known that I, BELLE SKOUGE, a citizen of the United States, and resident of Forest City, in the county of Winnebago and State of Iowa, have invented a certain new and useful Cooking Vessel, of which the following is a specification.

The object of my invention is to provide a cooking vessel of simple, durable and inexpensive construction for removing the coarse pulp and the skins and seeds from fruit.

More particularly is the object of my invention to provide a cooking vessel of the collapsible type in which fruit or the like may be thoroughly stirred while it is being cooked, which vessel is capable of being adjusted easily and readily to a proper position for draining juice or liquids from the pulp and coarse parts. In my improved vessel, I provide means for thoroughly stirring the fruit or other matter therein, while juice or liquids are being drained therefrom.

A further object is to provide such a vessel by which the cooking and the removing of the seeds and the like may be accomplished without danger of burning the person using the vessel.

It is a further object of my invention to provide a cooking vessel composed of elements which may be easily taken apart for cleaning.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a cooking vessel embodying my invention partly in section. Fig. 2 shows a top or plan view of the same. Fig. 3, shows a top or plan view of the perforated bottom of my cooking vessel. Fig. 4, shows a side elevation of the inner vessel in its collapsed position, and Fig. 5 shows a detail view of the ear on an outer vessel.

The general purpose of my device is to use a kettle placed within a larger kettle. In the drawings submitted herewith, I have used the reference numeral 10 to indicate the larger and outer preserving kettle. 11 indicates the ears thereto, to which is pivotally secured an ordinary handle or bail. The inner vessel is of the collapsible type similar to the common collapsible drinking cup comprising a plurality of cylindrical members 13, 14 and 15. The members forming the collapsible kettle are open at both ends except in the case of the lower member. The lower edges of said members are bent inwardly to form a rim 16 and the upper edges are bent outwardly to form a rim 17. The members of the collapsible vessel are graded in size, the lowest of said members when the vessel is expanded being the smallest. The upper rim of each lower member or section of the collapsible vessel engages the lower rim on the next upper member or section and prevents the upper section from being lifted above the upper circumference of the lower section. The lower section 13 is provided with a perforated bottom $17^a$. Below the lower section is placed a cross member 18 extending to a point beyond the circumference of the bottom of the lower section on each side. I preferably construct the cross member 18 with arms 19 extending at right angles from the middle of the cross member 18 to a point near the outer wall of the section 13. Pivotally mounted in the ends of the member 18 are uprights 20 extending to a point above the collapsible kettle when the same is in its expanded position. The upper ends of the uprights 20 are provided with heads or are bent approximately at right angles to said uprights to form the handles 21 for the convenience of the user. Nuts $20^a$ are placed on the lower ends of the uprights 20. Lugs 22 are formed on the uprights 20 adjacent to the upper edge of the lower section 13. On opposite sides of the upper section 15 of the collapsible kettle are secured ears 23 which extend to a point above the upper circumference of the section 15. Lugs 24 are formed near the upper ends of the ears 23 extending away from the section 15 and are designed for supporting the collapsible kettle on the outer kettle 10, as clearly shown in Fig. 1. At the upper ends of the ears 23 at points spaced above the upper circumference of the section 15 are horizontal extensions 25 formed with openings in which the uprights 20 are slidingly received. I preferably use an outer kettle 10 which has ears 11 constructed with recesses 26 in their upper edges designed to receive the lugs 24 and to prevent movement of the latter around the upper edge of the outer kettle.

For stirring fruit or the like placed in the inner kettle, I provide a device which will now be described.

A supporting frame comprising the radially extending members 27, is placed on the upper edge of the section 15. The lower sides of the outer ends of the members 27 are constructed with rabbets 28 designed to fit the upper edge of section 15. The supporting frame is provided with a central opening to slidingly receive an upright 29 which extends from a point near the bottom of the collapsible vessel when the latter is in its expanded position to a point above the supporting frame, and is provided with a handle 30 at right angles to the upright 29. The outer end of the handle is preferably covered with wood or some other substance 31 which is a poor conductor of heat. To the lower end of the upright 29 is secured a dasher or stirring device composed of perforated wings 33 extending radially to points near the wall of the lower section 13 of the collapsible vessel. The upright 29 rotates freely in the supporting frame.

In assembling and using my cooking vessel, the collapsible kettle is placed within the outer kettle 10 with the lugs 24 engaging the upper circumference of said outer kettle. The supporting frame comprising the members 27 and having the upright 29 rotatably mounted therein is placed on the collapsible kettle with the rabbets 28 engaging the upper circumference thereof. Fruit or other material is then placed in the inner kettle and heat applied. It is understood that the total height of the section comprising the collapsible kettle is somewhat less than the total depth of the outer kettle. As the fruit is cooked the stirring device is moved by means of the handle 31. During the stirring process, the juice and liquids from the fruit will pass through the perforated bottom of the collapsible kettle into the outer kettle 10. If the outer kettle is provided with ears 11 having the recesses 26 for receiving the lugs 24, any rotation of the inner kettle with relation to the outer kettle is prevented. If such ears are not used, such rotation may be prevented by manually holding one of the handles 21 or the lugs 24. When the user desires to complete the process of draining the juice and liquid from the material in the collapsible kettle, the uprights 20 are rotated by means of the handles 21 until the lugs 22 will not engage the members of the collapsible kettle above such lugs, and the handles 21 are then drawn upwardly lifting the lower sections of the collapsible kettle which rest on the cross member 18 until they are contained within the upper section 15. The uprights 20 are then rotated by means of the handles 21 until the lugs 22 are above the upper rim or circumference of the upper section 15. The lower sections of the collapsible vessel are then supported within the upper sections thereof, by means of the cross member 18, the uprights 20 and the lugs 22. The stirring device may then be used and the contents of the inner vessel thoroughly drained. When desired the inner vessel may be readily lifted out of the vessel 10 and the contents of both vessels removed. It is then very easy to clean the whole apparatus. The perforated bottom and the cross member 18 may be easily separated for cleaning by collapsing the inner vessel. By removing the nuts 20$^a$ the uprights 20 may be removed.

My device has the great advantage of enabling the user to heat fruit or the like in the collapsible vessel and to thoroughly stir the same and separate the pulp, seeds and skins from the juice, then to lift the vessel containing the pulp, seeds and skins above the level of the liquid in the outer vessel 10 and to stir the contents of the collapsible vessel and thoroughly drain them while they are at all times subject to heat. The vessel containing the seeds may then be entirely removed and the juice left to cook as long as desired. The position of the collapsible vessel with reference to the bottom of the vessel 10 is adjustable. The inner vessel may be used with outer vessels of various sizes since the lugs 24 are preferably made of sufficient length for this purpose. All parts of my device may be easily taken apart for cleaning as above shown.

I claim as my invention:

1. The combination of an outer vessel, a collapsible vessel having a perforated bottom, received in said outer vessel, a supporting cross member under said collapsible vessel extending beyond the sides thereof, uprights slidingly mounted in the ends of said cross member and extending to points above said outer vessel, nuts on the lower ends of said uprights, ears on the upper edge of the upper part of said collapsible vessel extending to points above the upper circumference thereof, lugs extending outwardly from said ears and designed to rest on the upper edge of the receiving vessel, lateral extensions on the upper ends of said ears spaced above the upper edge of said collapsible vessel and forming bearings in which the uprights are slidingly received, lugs on said uprights at such points and of such size that they may rest on the upper edge of the collapsible vessel when the same is collapsed.

2. The combination of an outer vessel, a collapsible vessel having a perforated bottom, received therein, a supporting cross member beneath said collapsible vessel extending beyond the circumference thereof, ears on the upper edge of said collapsible vessel extending above the same, lugs extending outwardly from said ears and resting on the upper edge of said outer vessel, lateral extensions on said ears forming bearings, uprights slidingly received in said bearings and in the ends of said supporting cross members, lateral extensions on the upper ends of said uprights, lugs on said uprights of such sizes and at such points that they may rest on the upper edge of said collapsible vessel when the latter is in its collapsed position, nuts on the lower ends of said uprights, means for stirring the contents of said collapsible vessel.

3. The combination of an outer vessel, a collapsible vessel having a perforated bottom, received therein, a supporting cross member beneath said collapsible vessel extending beyond the circumference thereof, ears on the upper edge of said collapsible vessel extending above the same, lugs extending outwardly from said ears and resting on the upper edge of said outer vessel, lateral extensions on said ears forming bearings, uprights slidingly received in said bearings and in the ends of said supporting cross members, lateral extensions on the upper ends of said uprights, lugs on said uprights of such sizes and at such points that they may rest on the upper edge of said collapsible vessel when the latter is in its collapsed position, nuts on the lower ends of said uprights, a supporting frame, on said collapsible vessel, an upright dasher arm rotatably mounted therein, a dasher on the lower end of said dasher arm, a handle on the upper end of said dasher arm.

4. The combination of an outer vessel, a collapsible vessel having a perforated bottom, received therein, a supporting cross member beneath said collapsible vessel extending beyond the circumference thereof, ears on the upper edge of said collapsible vessel extending above the same, lugs extending outwardly from said ears and resting on the upper edge of said outer vessel, lateral extensions on said ears forming bearings, uprights slidingly received in said bearings and in the ends of said supporting cross members, lateral extensions on the upper ends of said uprights, lugs on said uprights of such sizes and at such points that they may rest on the upper edge of said collapsible vessel when the latter is in its collapsed position, nuts on the lower ends of said uprights, a supporting frame, on said collapsible vessel, an upright dasher arm rotatably mounted therein, a dasher on the lower end of said dasher arm, a handle on the upper end of said dasher arm, and means for preventing rotation of said collapsible vessel with reference to said outer vessel.

5. The combination of an outer vessel, a collapsible vessel having a perforated bottom, received therein, a supporting cross member beneath said collapsible vessel extending beyond the circumference thereof, ears on the upper edge of said collapsible vessel extending above the same, lugs extending outwardly from said ears and resting on the upper edge of said outer vessel, lateral extensions on said ears forming bearings, uprights slidingly received in said bearings and in the ends of said supporting cross members, lateral extensions on the upper ends of said uprights, lugs on said uprights of such sizes and at such points that they may rest on the upper edge of said collapsible vessel when the latter is in its collapsed position, nuts on the lower ends of said uprights, a supporting frame on said collapsible vessel, an upright dasher arm rotatably mounted therein, a dasher on the lower end of said dasher arm comprising perforated wings extending radially from said dasher arm, a handle on the upper end of said dasher arm.

Des Moines, Iowa, April 8, 1911.
      BELLE SKOUGE.

Witnesses:
 N. N. JOHNSON,
 SUMNER E. ISAACS.

---

Copies of this patent may be obtained for five cents each, by addressing the "Commissioner of Patents, Washington, D. C."